S. T. MOORE.
Bung-Faucet.
No. 202,855. Patented April 23, 1878.
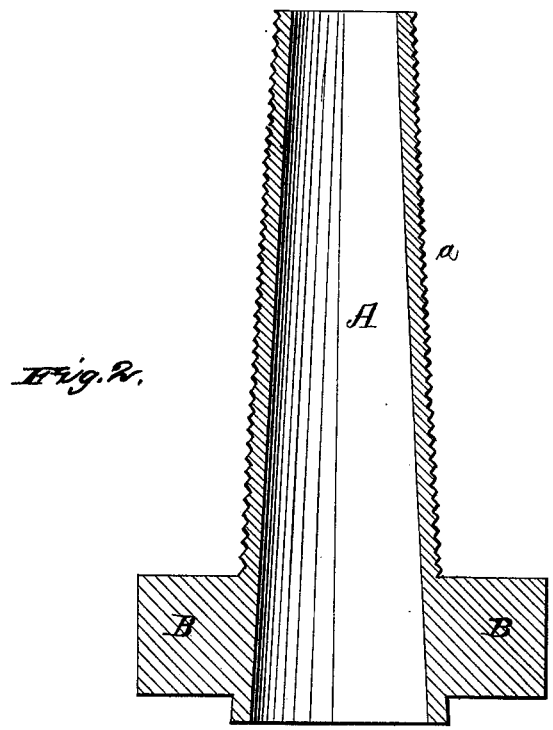
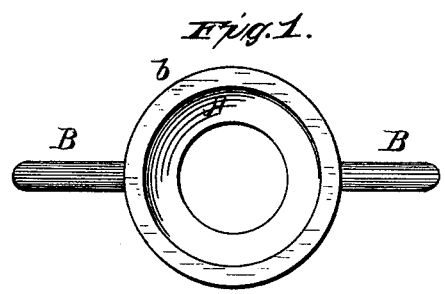
WITNESSES
INVENTOR
ATTORNEYS

UNITED STATES PATENT OFFICE.

SAMUEL T. MOORE, OF BALTIMORE, MARYLAND.

IMPROVEMENT IN BUNG-FAUCETS.

Specification forming part of Letters Patent No. 202,855, dated April 23, 1878; application filed February 26, 1878.

*To all whom it may concern:*

Be it known that I, SAMUEL T. MOORE, of Baltimore, in the State of Maryland, have invented certain new and useful Improvements in Bung-Faucets; and do hereby declare that the following is a full, clear, and exact description thereof, reference being had to the accompanying drawings, and to the letters of reference marked thereon, making a part of this specification.

The nature of my invention consists in the construction and arrangement of a device for insertion in the bung-hole of a barrel or cask or other liquid-receptacle, to empty the same of its contents, as will be hereinafter more fully set forth.

In order to enable others skilled in the art to which my invention appertains to make and use the same, I will now proceed to describe its construction and operation, referring to the annexed drawing, in which—

Figure 1 is an end view, and Fig. 2 a longitudinal section, of my invention.

A represents a hollow tapering tube, of any suitable dimensions, provided with exterior screw-threads $a\ a$, extending from the smaller end of the tube nearly the entire length, leaving, however, at the larger end, a smooth band or ring, $b$, as shown. From this portion of the tapering tube A project, in opposite directions, two wings, B B, which are of such suitable size that they can be used as levers or hand-holds for screwing the tube into the bung-hole of a cask or barrel.

This device can be used for casks, barrels, or similar vessels of any size, or having any size of bung-hole, owing to the tapering form of the tube, and no wrench or instrument of any sort is needed to apply the tube in the bung-hole.

Having thus fully described my invention, what I claim as new, and desire to secure by Letters Patent, is—

The hollow tapering tube A, open at both ends, provided with the exterior screw-threads $a$, and at its larger end with the outwardly-projecting wings or hand-holds B B, the screw-threads extending the entire length of the tube from the wings B to the smaller end, substantially as and for the purposes herein set forth.

In testimony that I claim the foregoing I have hereunto set my hand this 14th day of February, 1878.

SAMUEL T. MOORE.

Witnesses:
FRANK GALT,
H. AUBREY TOULMIN.